(No Model.) 4 Sheets—Sheet 1.

A. H. SUTTON.
PLICATING MACHINE.

No. 466,023. Patented Dec. 29, 1891.

WITNESSES.
Frank. Miller.
Albert H. Bates.

INVENTOR.
Andrew H. Sutton
By his attorney
E. L. Thurston (No Model.) 4 Sheets—Sheet 2.

A. H. SUTTON.
PLICATING MACHINE.

No. 466,023. Patented Dec. 29, 1891.

WITNESSES.
Frank. Meiller.
Albert H. Baker

INVENTOR,
Andrew H. Sutton.
By his attorney
E. L. Thurston (No Model.) 4 Sheets—Sheet 3.

A. H. SUTTON.
PLICATING MACHINE.

No. 466,023. Patented Dec. 29, 1891.

WITNESSES.
Frank Miller.
Albert H. Baker.

INVENTOR.
Andrew H. Sutton
By his attorney
E. L. Thurston (No Model.) 4 Sheets—Sheet 4.

A. H. SUTTON.
PLICATING MACHINE.

No. 466,023. Patented Dec. 29, 1891.

WITNESSES.
Frank Miller.
Albert H. Bates

INVENTOR.
Andrew H. Sutton
By his attorney
E. L. Thurston

UNITED STATES PATENT OFFICE.

ANDREW H. SUTTON, OF NEW YORK, N. Y.

PLICATING-MACHINE.

SPECIFICATION forming part of Letters Patent No. 466,023, dated December 29, 1891.

Application filed February 6, 1891. Serial No. 380,474. (No model.)

*To all whom it may concern:*

Be it known that I, ANDREW H. SUTTON, a citizen of the United States, residing in the city, county, and State of New York, have invented certain new and useful Improvements in Plicating-Machines, of which the following is a specification.

My invention relates to machines adapted to plicate fabrics—that is to say, to fold them lengthwise of the web.

The object of my invention is to provide means for folding the fabric into three, four, or more plies, the entire number of plies being laid during a single drawing of the fabric through one complete machine, in contradistinction to the method heretofore proposed, as shown in Scholfield's Patent No. 229,479, of drawing the fabric through several similar machines, which act successively on the fabric, each machine making one fold therein.

Figure 1:
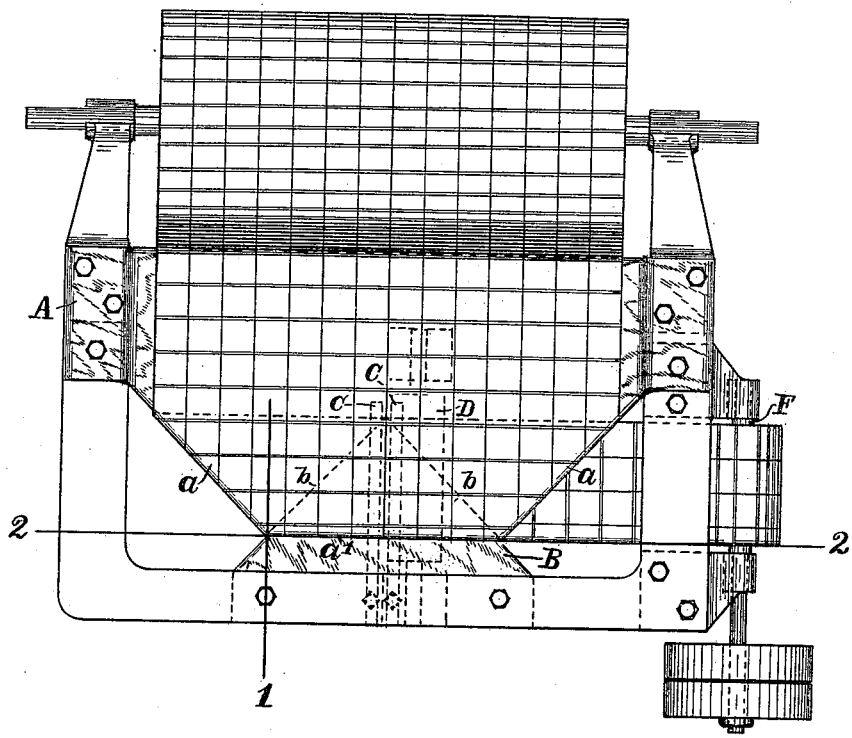
Figure 2:
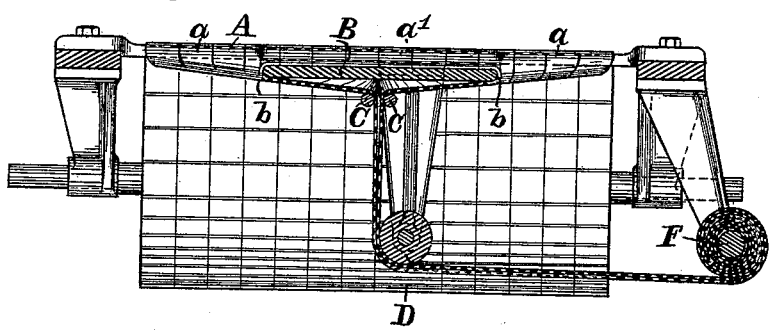
Figure 3:
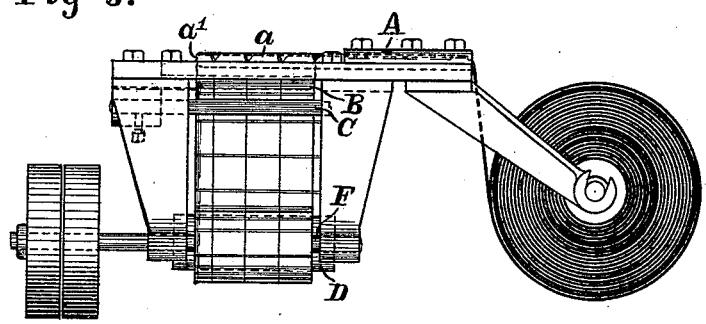
Figure 4:
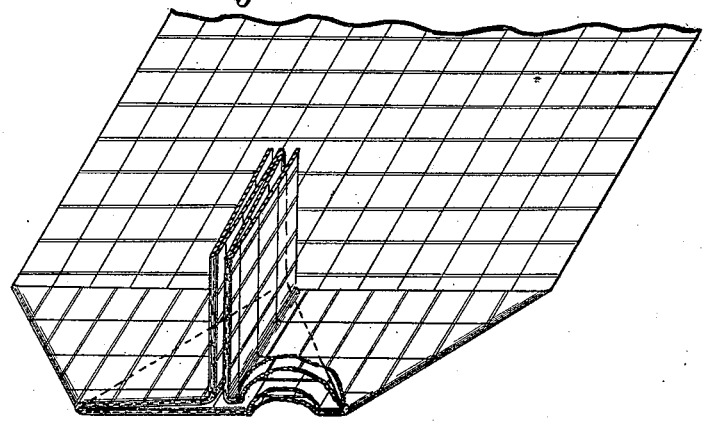
Figure 5:
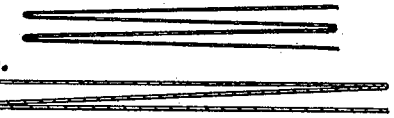
Figure 6:
Figure 7:
Figure 8:
Figure 10:
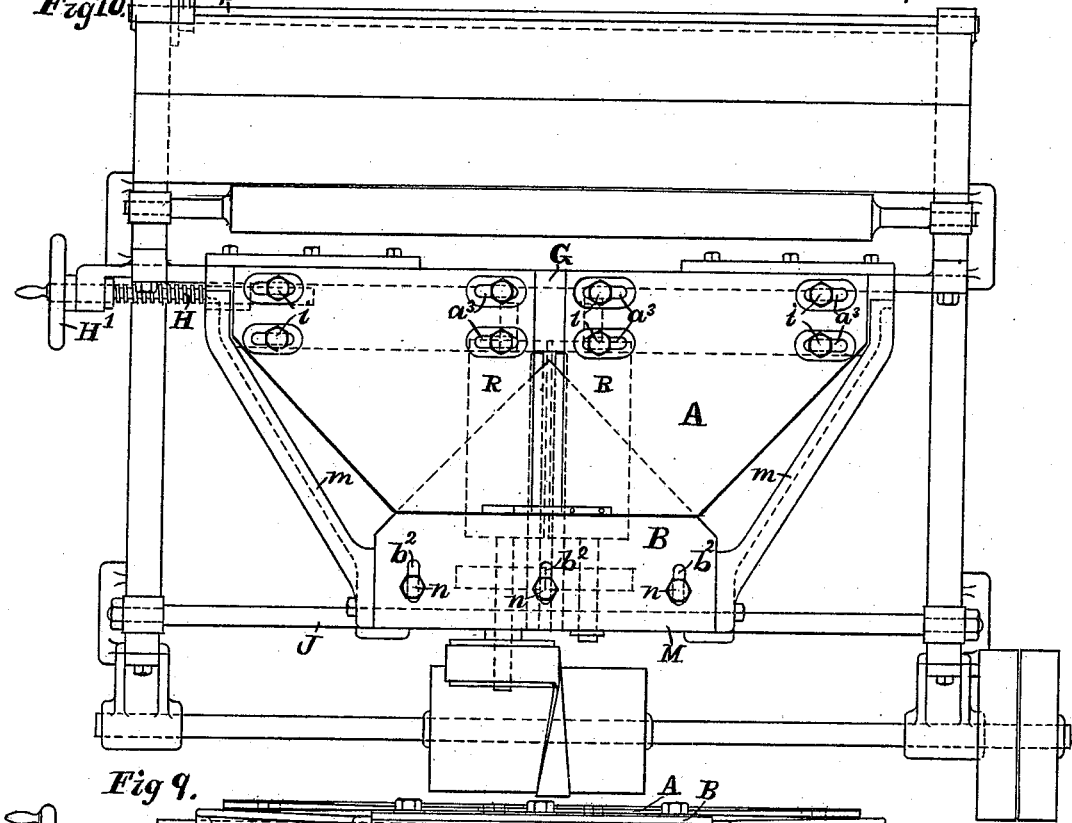
Figure 9:
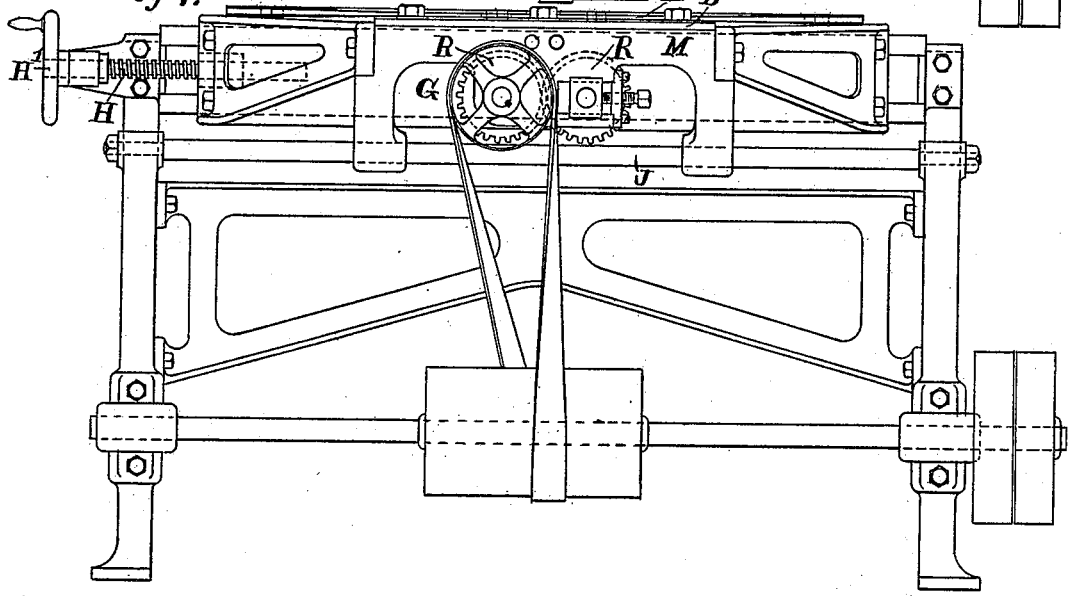
Figure 11:
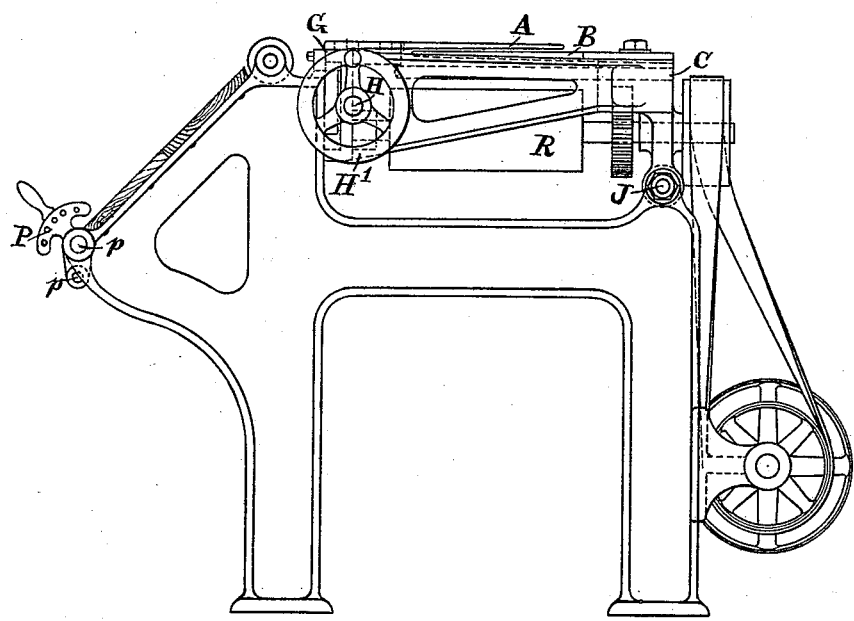
Figure 12:
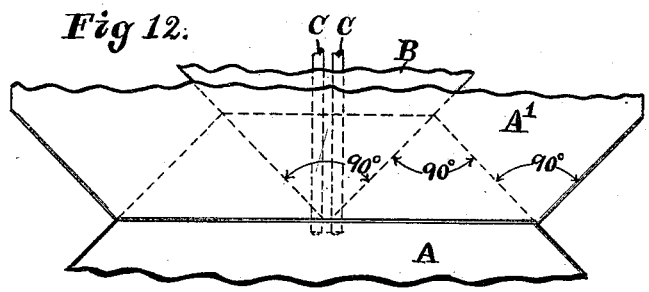

In the drawings, Figure 1 is a plan view of the machine in its simplest form. Fig. 2 is a front end view of said machine, from which the extreme front part has been cut at the line 2 2 of Fig. 1. Fig. 3 is a side elevation from that side of the machine to which the plicated fabric is drawn. No supporting-legs to the machine are shown in the three figures above described, the reason being that these figures are intended to show only the part of the machine which contains the principal and foundation invention and that in its simplest form. Fig. 4 is a perspective view of the fabric turned bottom up, showing the path traveled by the different parts thereof in the plicating operation. Fig. 5 is an end view of the fabric, showing the relative position of the four plies when laid with the machine. Fig. 6 is an end view of the folded fabric when laid in three plies. Figs. 7 and 8 are similar views of the folded fabric when laid in five and six plies, respectively. Fig. 9 is a front end elevation of a machine containing my invention and having means for adjusting the parts, whereby the machine is adapted to plicate different kinds of fabric. Fig. 10 is a top plan view of the plicating-frames used with the machine shown in Fig. 9. Fig. 11 is a side elevation of said machine. Fig. 12 is a top plan view, and Fig. 13 a side view, of plicating-frames arranged to lay the fabric in any number of plies or folds up to six.

Referring now to the parts by letters, and, for the time being, referring particularly to the simplest form of the machine, as shown in Figs. 1, 2, and 3, A represents a plicator-frame which is, during the operation of the machine, rigidly secured at its base or broadest part to the frame of the machine. Its sides *a a* lie at substantially an angle of ninety degrees to each other and at an angle of substantially forty-five degrees to the base-line of the plicator-frame. These sides *a a* of the plicator-frame form what I term the "plicating edges." The front end of the plicator lies at substantially right angles to the path traveled by the fabric as it approaches the plicator-frame.

The plicator-frame A may be said to be in the form of an isosceles trapezoid, the equal sides of which lie at angles of substantially forty-five degrees to the base.

The front edge *a'* of the plicator-frame A I call the "returning edge," because the fabric when drawn over this edge is turned back and caused to move in a direction substantially parallel and opposite to that in which it was traveling before being so turned.

Directly beneath the plicator-frame A is the plicator-frame B, triangular in form, and rigidly secured at its base to a part of the frame of the machine which lies in front of the returning edge of the plicator A. The apex of the plicator B lies directly beneath the longitudinal middle line of the plicator A, and its sides or plicating edges *b b* lie substantially at right angles to each other and at angles of forty-five degrees to the middle line, above referred to, and to the returning edge *a'* of the plicator A.

The distance measured vertically between the two plicator-frames A and B should be sufficient to allow the free passage between them of two thicknesses of the fabric being plicated in the machine, and the distance should not be much greater than that. The returning edge *a'* extends on both sides very slightly beyond the plicating edges of the frame B.

Directly beneath the plicator B are the guide-fingers C C, rigidly held in a position, substantially as shown, separated sufficiently to permit the completely-plicated fabric to pass between them, said fingers lying one slightly to one side and the other slightly to the other side of the middle line of the machine.

The plicator-frames A and B may be made of any suitable metal or other material. They should be smoothly finished, especially at the edges over which the fabric is turned, and they should be as thin as is consistent with the necessary rigidity. They should preferably decrease in thickness from the base toward the returning edge in plicator A and toward the apex in plicator B.

The fabric to be plicated, as shown in Fig. 3, is drawn from a roll, which roll is suitably mounted, substantially as shown, whereby the fabric as it unwinds may be drawn evenly lengthwise of the machine to and over the plicating-frames provided. The friction of the roll-arbor in its bearings may be relied upon, generally, to supply a sufficient tension or back pull upon the fabric to keep it smooth. After the fabric has been threaded or started through the plicating-frames and guiding-fingers it is drawn along by any suitable mechanism—as, for example, that shown in Figs. 1, 2, and 3—that is to say, the plicated fabric is secured to the revolving arbor F, upon which it is wound as said arbor is revolved. In passing over the plicating-frames the outer edges of the fabric are turned over the inclined plicating edges of the plicator A into a path at right angles to their former paths of travel, and then proceed to the guide-fingers C C, between which they pass. The middle part of the fabric is turned back upon itself over the returning edge of the plicator A, then passes to the inclined plicating edges of the plicator B, over which it is turned into paths at right angles to its former path toward the guide-fingers between which it passes, the center fold in the fabric being formed at the part of the cloth which passes from the apex of the plicator A. The quadruplicated cloth, after passing between the guide-fingers, passes under the shunt-roll D to the revolving arbor, upon which it is wound, and by which the entire fabric is drawn over the plicator-frames and quadruplicated, as above described.

If it is desired to lay the fabric in three plies, as shown in Fig. 6, one selvage edge is guided along the line 1 1 in Fig. 1—that is, so that it will not be turned over the plicating edge $a$ on that side of the machine, but will be first turned over the returning edge $a'$ of the plicator-frame A.

Fig. 4 shows the path of the different parts of the fabric from the time it enters the machine until it has passed between the guiding-fingers as described and shown.

No means for relatively adjusting any of the parts are shown in Figs. 1, 2, and 3, it being understood that a machine constructed in this manner shall be properly put together in the first instance, whereby it is adapted to fold in the manner specified a certain kind or kinds of fabric; but in the practical use of a machine of this character with fabrics of different kinds it is desirable to have means for first adjusting the plicator-frames relatively to each other; second, for applying more or less tension on different kinds of fabrics or on different parts of the web of the same fabric; third, for moving the plicator-frames transversely of the machines during the plicating operation, whereby it is possible to keep the crease-lines straight and lay the plies regularly, even if the fabric, because of variance in its elasticity or for any other reason, is not fed in an absolutely straight line.

The machine shown in Figs. 9, 10, and 11 is supplied with the several adjusting mechanisms above referred to, as will fully appear from the following description. A transversely-movable carriage G is mounted on a slide, to which it is secured by suitable glands, and a screw H and a hand-wheel H' are provided for moving this carriage in either direction whenever desired. The plicator-frame A is adjustably secured to this carriage by means of screws $i$ and the transverse slots $a^3$ in the base of said frame, the heads of the screws lying beneath the upper surface of the frame.

Rigidly fixed to the sides of the carriage G are the arms $m\ m$ of the bracket M. The plicating-frame B is secured to this bracket by the screws $n\ n$ and the longitudinal slots $b^2\ b^2$ in the base of the plicator-frame. Thus by loosening the screws the plicator-frame A is movable transversely of the machine, and the plicating-frame B is movable lengthwise of the machine, whereby the frames may be placed in any relative position which may be necessary. The outer or forward end of the bracket M is supported upon the guide-rod J, upon which it slides freely when the carriage is moved, as above described.

At P is shown one form of adjustable tension-rolls, by which the tension of the fabric may be varied at will. The fabric in being fed to the machine passes between the two rolls $p\ p$, one of which is movable relatively to the other, whereby said fabric may be deflected more or less from a direct path, and thus have more or less tension applied thereto.

The fabric may be fed from a pile or roll, as the case may be. The plicated fabric is drawn from the machine by the two coacting draft-rolls R R, one of which at least is driven. The plicated fabric may be discharged into a suitable box or wound upon a board or roll—both common practices with plicating-machines; or it may be delivered without intermediate handling to a rigging-machine.

Figure 13:

Figs. 12 and 13 show the manner in which three plicating-frames may be employed for the purpose of laying five or six plies in the cloth. The triangular plicating-frame B is retained; but a second plicating-frame A' in the form of an isosceles trapezoid is arranged above the plicating-frame A. The returning edge of the plicator A' is a trifle wider than the base—that is, the distance between the operative parts of the plicating edges—of the frame A, and the plicating edges of the plicator A' lie substantially at right angles to the plicating edges of the plicator next beneath it. Theoretically any number of plicating-frames substantially like the plicator-frame A, each bearing substantially the relation as to size to the frames next to it, as above described, may be employed. The practical limitation imposed in this increase in the number of plicating-frames will depend largely upon the strength of the fabric which it is proposed to plicate therewith. Each plicator-frame added increases by two the number of plies which may be laid. When both inclined plicating edges of the first plicator-frame are utilized, an even number of plies is laid. When the selvage edge of the fabric is so guided that the fabric is drawn over only one of the inclined plicating edges of the first plicator, an odd number of plies is laid.

I have hereinbefore in describing the plicator-frame stated that the plicating edges of each plicating-frame should lie at angles of substantially forty-five degrees to the base line or ninety degrees to each other, and have also stated that preferably the plicating-frames should decrease in thickness from the base outward. It is impossible to state to what extent exactly these angles may be varied or what exactly should be the increase in thickness of the frames. It may be stated, however, as a general proposition that the more elastic the fabric the thicker relatively must be the parts of the plicator-frames nearest the base or the greater must be the angle which is (or would be) formed by the meeting of the two plicating edges.

Persons familiar with plicating-machines of the general character described in Letters Patent No. 229,479, granted June 20, 1888, to J. J. Scholfield, will readily understand the principles upon which these variations may be made.

Having thus described my invention, what I claim as new, and desire to secure by Letters Patent, is—

1. In a plicating-machine, the combination of a frame in the form of an isosceles trapezoid, supported at its longest side, a triangular plicating-frame supported at one of its sides, and two separated guiding-fingers, said parts being arranged one above the other, substantially as described, with the longitudinal middle line of both frames and the opening between the guiding-fingers in substantially the same vertical plane with mechanism for drawing a fabric over said frames and between said guiding-fingers, for the purpose specified.

2. The combination of a triangular plicating-frame and guide-fingers, with one or more plicating-frames in the form of isosceles trapezoids, all of said frames lying one above the other in the order of their size, the plicating edges of each being inclined oppositely to the plicating edge of the plicator next beneath it, substantially as and for the purpose specified.

3. The combination of the transversely-movable carriage, a plicating-frame A in the form of an isosceles trapezoid, secured at its base to said carriage, with a bracket having two arms which are secured to said carriage, a guide-bar supporting said bracket, a triangular plicating-frame B, secured at its base to said bracket, having its inclined plicating edges inclined oppositely to those of the plicating-frame A, and guide-fingers also secured to said bracket, substantially as and for the purpose specified.

4. The combination of the plicating-frame in the form of an isosceles trapezoid, supported at its base, and a triangular plicating-frame also supported at its base, the two frames being arranged relatively, substantially as described, and means for moving said frames for the purpose of adjustment, one longitudinally and one transversely of the machine and guiding-fingers, substantially as and for the purpose specified.

ANDREW H. SUTTON.

Witnesses:
REGINALD YOUNG,
JAMES G. JOSLIN.